United States Patent
Gouache et al.

(10) Patent No.: US 10,856,015 B2
(45) Date of Patent: Dec. 1, 2020

(54) METHOD FOR OPERATING A CACHE ARRANGED ALONG A TRANSMISSION PATH BETWEEN CLIENT TERMINALS AND AT LEAST ONE SERVER, AND CORRESPONDING CACHE

(71) Applicant: INTERDIGITAL CE PATENT HOLDINGS, Paris (FR)

(72) Inventors: Stephane Gouache, Cesson Sevigne (FR); Remi Houdaille, Cesson Sevigne (FR); Charline Taibi, Chartres de Bretagne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/127,718

(22) PCT Filed: Mar. 12, 2015

(86) PCT No.: PCT/EP2015/055221
§ 371 (c)(1),
(2) Date: Sep. 20, 2016

(87) PCT Pub. No.: WO2015/140050
PCT Pub. Date: Sep. 24, 2015

(65) Prior Publication Data
US 2018/0176613 A1    Jun. 21, 2018

(30) Foreign Application Priority Data

Mar. 20, 2014 (EP) ..................... 14305393

(51) Int. Cl.
*H04N 21/231* (2011.01)
*H04N 21/2343* (2011.01)
(Continued)

(52) U.S. Cl.
CPC ... *H04N 21/23106* (2013.01); *H04L 65/4084* (2013.01); *H04L 65/80* (2013.01);
(Continued)

(58) Field of Classification Search
CPC ......... G06F 17/30067; G06F 17/30203; H04L 2029/06054; H04L 65/4084;
(Continued)

(56) References Cited

U.S. PATENT DOCUMENTS

2004/0054777 A1    3/2004 Ackaouy et al.
2010/0281217 A1    11/2010 Sundarrajan et al.
(Continued)

FOREIGN PATENT DOCUMENTS

CN    101147379    3/2008
JP    2005539315    12/2005
(Continued)

*Primary Examiner* — Rong Le
(74) *Attorney, Agent, or Firm* — Volpe Koenig

(57) ABSTRACT

Cache (DANE) located along a transmission path between client terminals (CT) and at least one server (SE) and configured to receive requests from client terminals (CT) for segments of a multimedia content available at several representations, which comprises: —an interface of connection (1) for receiving, from a first client terminal, a first request for a preferred representation and at least one alternative representation of a given segment of said multimedia content; —a matching module (5) configured to determine if at least one ongoing representation of said given segment, already requested by the cache from a server for a further client terminal, matches the preferred representation or an alternative representation of the first request.

15 Claims, 4 Drawing Sheets

(51) Int. Cl.
*H04N 21/24* (2011.01)
*H04N 21/845* (2011.01)
*H04L 29/06* (2006.01)
*H04L 29/08* (2006.01)

(52) U.S. Cl.
CPC ... *H04L 67/2842* (2013.01); *H04N 21/23439* (2013.01); *H04N 21/234345* (2013.01); *H04N 21/2402* (2013.01); *H04N 21/845* (2013.01); *H04N 21/8456* (2013.01); *H04L 67/02* (2013.01)

(58) Field of Classification Search
CPC .. H04L 67/1002; H04N 21/21; H04N 21/214; H04N 21/222; H04N 21/2221; H04N 21/2223; H04N 21/2225
See application file for complete search history.

(56) References Cited

U.S. PATENT DOCUMENTS

| | | | |
|---|---|---|---|
| 2012/0284371 A1* | 11/2012 | Begen | H04L 65/1069 709/219 |
| 2013/0097309 A1 | 4/2013 | Ma et al. | |
| 2013/0173737 A1* | 7/2013 | Liu | H04N 21/23439 709/213 |
| 2015/0188841 A1* | 7/2015 | Gratton | H04L 47/78 370/468 |

FOREIGN PATENT DOCUMENTS

| | | |
|---|---|---|
| WO | WO2012109520 | 8/2012 |
| WO | WO2014206745 | 12/2014 |
| WO | WO2014206762 | 12/2014 |

\* cited by examiner

METHOD FOR OPERATING A CACHE ARRANGED ALONG A TRANSMISSION PATH BETWEEN CLIENT TERMINALS AND AT LEAST ONE SERVER, AND CORRESPONDING CACHE

This application claims the benefit, under 35 U.S.C. § 365 of International Application of PCT/EP15/055221 filed Mar. 12, 2015, which was published in accordance with PCT Article 21(2) on Sep. 24, 2015, in English, and which claims the benefit of European Application No. 14305393.2, filed Mar. 20, 2014.

TECHNICAL FIELD

The present invention relates generally to the domain of the adaptive streaming technology over, for instance but not exclusively, HTTP (HyperText Transfer Protocol) and, in particular, to the management of the behavior of a cache arranged along the transmission path between client terminals and remote servers.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Adaptive streaming over HTTP (also called multi-bitrate switching) is quickly becoming a major technology for multimedia content distribution. Among the HTTP adaptive streaming protocols which are already used, the most famous are the HTTP Live Streaming (HLS) from Apple, the Silverlight Smooth Streaming (SSS) from Microsoft, the Adobe Dynamic Streaming (ADS) from Adobe and the Dynamic Adaptive Streaming over HTTP (DASH) developed by 3GPP within the SA4 group.

When a client terminal wishes to play an audiovisual content (or A/V content) in adaptive streaming, it first has to get a file describing how this A/V content might be obtained. This is generally done through the HTTP protocol by getting a descripting file, so-called manifest, from an URL (Uniform Resource Locator), but can be also achieved by other means (e.g. broadcast, e-mail, SMS and so on). The manifest basically lists the available representations (also called instances or versions) of such an A/V content (in terms of bitrate, resolution and other properties); one representation per quality level (bitrate). Each representation is made of a series of segments (also called chunks) of equal duration—accessible by a separate URL—and has a set of descriptive elements attached for selection by the client. Said manifest is generated in advance and delivered to the client terminal by, for instance, a remote server.

Indeed, the stream of data corresponding to the A/V content is available on an HTTP server with different qualities. The highest quality is associated with a high bitrate; the lowest quality is associated with a low bitrate. This allows distribution to many different terminals which might be subject to highly varying network conditions.

The whole data stream of each representation is divided into segments of equal duration which are made such that a client terminal may smoothly switch from one quality level to another between two segments. As a result, the video quality may vary while playing but rarely suffers from interruptions (also called freezes).

At the client side, the segments are selected based on a measure of the available bandwidth of the transmission path. In particular, a client terminal usually requests the representation of a segment corresponding to a bitrate encoding and thus a quality compliant with the measured bandwidth.

When a cache is along the transmission path between a client terminal and a remote server which frequently occurs, one representation of a given segment may already be stored in said cache, in case another client has previously requested the same segment with the same representation or in case a Content Delivery Network (CDN) has already provisioned the segment in the cache. Thus, the response to an HTTP request for said given segment is faster than if the segment comes from the remote server and duplicate transmission can be avoided, effectively saving network resources.

Usual HTTP caches are designed to serve content transparently by making efforts to ensure that content delivered to any client will be the same as if the content came directly from the server.

In case of the delivery of a HAS content (e.g. a DASH content), all video representations of a given time slot are equivalent for the end user (namely they correspond to the same audio and video content), but differ in video (and possibly audio) quality. In a DASH system, technical limitations of the network do not allow to maintain the best quality, so it is considered as normal to use segment representations of various quality levels. While the initial goal of DASH is that clients make the choice of representation, advanced caches (also called smart caches) allow the client to widen the choice by allowing alternative representations to be returned from the cache when the required representation is not available in said cache; as it is described in the European patent applications EP13305908.9 and EP13305909.7 filed by the Applicant.

Nevertheless, an issue arises when multiple clients hit the cache concurrently requesting the same resources (e.g. tuning into the same program) with different choices of overlapping representations. By "concurrently", it should be understood requests happening at an interval lower than the segment duration. Such a situation arises frequently and is detrimental to the whole delivery chain.

Indeed, the general functioning of known caches (so called legacy cache) is as follows. Upon receipt of a request (called Ra) for a given resource (called X, X being an URL), if the requested content is not cached (e.g. previously downloaded and stored for further reuse), it initiates a request towards the remote server and starts forwarding the response to the client as soon as it begins receiving it from the server. Upon arrival of a second request (called Rb)—before the end of the current request (Ra)—for the same resource (X), after an optional revalidation step of the response contents with the server, the same response content will start being forwarded to the second client. Upon arrival of another request (called Rc) for another resource (called Y, Y being an URL) not cached and distinct from X (e.g. in case the request is emitted for a DASH segment, X={rep4} and Y={rep 6} referring to the same temporal offset within the same content), the cache handles the request in parallel of the previous requests since they are unrelated.

In other words, a known cache enqueues requests (Ra, Rb) for the same resource (X), whereas it handles unrelated requests in a fully parallel fashion (Rc versus Ra, Rb). This is highly desirable for obvious performance and bandwidth efficiency reasons.

In case the above requests (Ra, Rb, Rc) are emitted for retrieving a DASH segment, wherein a preferred representation is indicated together with a list of allowable alternatives (as explained in European patent applications EP13305908.9 and EP13305909.7), the cache (smart cache) behavior is as follows. If X={preferred=rep4, alternatives= [rep6, rep5] } and Y={preferred=rep6, alternatives=[rep5, rep4] }, assumed to be referring to the same temporal offset within the same content. By considering the above mentioned scenario described for known caches and by assuming that none of the preferred and alternative representations were cached, the cache would have served rep4 in response to requests (Ra, Rb) and rep6 in response to (Rc).

Nevertheless, such a behavior raises the two following issues:
 the cache considers the requests unrelated because it has ignored the alternatives list that creates a potential link between them;
 the cache has downloaded both representations from the server, possibly leading to congestion on the path between the server and the cache.

In addition, in a residential network, even if there are few devices, the scarcity of the access bandwidth makes it critical to avoid duplicating requests for a given segment. Considering a cache in an access network, the large number of concurrent sessions makes it very likely that contents will be requested for many of the possible alternatives. If the cache fails to optimally handle these concurrent requests, the network will be congested.

The present invention overcomes at least some of the above mentioned drawbacks.

SUMMARY

The invention concerns a method for operating a cache arranged along a transmission path between client terminals and at least one server, said cache being configured to receive requests from client terminals for segments of a multimedia content available at several representations, which is remarkable in that it comprises:
 receiving, from a first client terminal, a first request for a preferred representation and at least one alternative representation of a given segment of said multimedia content;
 determining an ongoing representation of said given segment, having already been requested by said cache from said server for a further client terminal, which matches the preferred representation or an alternative representation of the first request.

In an embodiment compliant with the present invention, said method may further comprise:
 determining a value of a usefulness function associated with a matched ongoing representation of said given segment having already been requested by said cache for a further client terminal;
 transmitting, to the first client terminal, said matched ongoing representation, already requested by the cache, when the corresponding determined value of the usefulness function meets a performance criterion.

Thanks to the invention, the cache can be made aware of the interdependency of requests having matched preferred representation and/or alternative representations. It can create more opportunities to match requests and to serialize them, reducing the amount of traffic with the servers.

In addition, in case at least two ongoing representations—matching with two distinct representations of the first request—have already been requested by said cache for further client terminals, the matched ongoing representation associated with the highest usefulness value may be transmitted when said usefulness value meets the performance criterion.

Moreover, in case at least two ongoing representations, matching with two distinct representations of the first request, have already been requested by said cache for further client terminals, the preferred representation of the first request can be requested by the cache to the server when none of the matched ongoing representations has a usefulness value which meets said performance criterion.

In another embodiment, the performance criterion can be met when the value of the usefulness function exceeds zero.

In a further embodiment, the usefulness function may depend on a mode of operation belonging to a group of modes comprising at least:
 an aggressive mode wherein the value of usefulness function is equal to a constant;
 a fast mode wherein the usefulness function depends on the delivery time from the server of the preferred representation of said first request and the delivery time of a matched ongoing representation already requested by said cache;
 a quality mode wherein the usefulness function depends on the quality of the preferred representation of the first request and the quality of a matched ongoing representation already requested by said cache.

In addition, the mode of operation may be determined in function of at least one network parameter (e.g. at the cache) or chosen by the first client terminal, by a further network equipment, by the cache owner or by a third party.

In case the mode of operation is chosen by the first client terminal (e.g. according to the user's preferences), the chosen mode of operation may be indicated within said first request.

In another aspect, the usefulness function of the fast mode can be defined by the difference between the delivery time from the server of the preferred representation of said first request and the delivery time of a matched ongoing representation already requested by said cache.

In a further aspect, the usefulness function of the quality mode is defined by the difference between the quality of the preferred representation and the quality of a matched ongoing representation already requested by said cache.

The present invention also concerns a cache located along a transmission path between client terminals and at least one server and configured to receive requests from client terminals for segments of a multimedia content available at several representations. Said cache comprises:
 an interface of connection for receiving, from a first client terminal, a first request for a preferred representation and at least one alternative representation of a given segment of said multimedia content;
 a matching module configured to determine if at least one ongoing representation of said given segment, already requested by the cache from a server for a further client terminal, matches the preferred representation or an alternative representation of the first request.

In addition, said cache may further comprise a calculator adapted to determine a value of a usefulness function associated with a matched ongoing representation of the given segment identified by said matching module.

Moreover, said cache may further comprise a comparator configured to determine the matched ongoing representation already requested by said smart cache having the highest value of the usefulness function, in case several ongoing representations matched with the preferred representation and alternative representations of the first request. Said comparator can be further configured to check whether the determined value of the usefulness function of a matched ongoing representation meets a performance criterion or not.

Moreover, the usefulness function can depend on a mode of operation belonging to a group of modes comprising at least:
- an aggressive mode wherein the value of usefulness function is equal to a constant;
- a fast mode wherein the usefulness function depends on the delivery time from the server (SE) of the preferred representation of said first request and the delivery time of a matched ongoing representation already requested by said cache (DANE);
- a quality mode wherein the usefulness function depends on the quality of the preferred representation of the first request and the quality of a matched ongoing representation already requested by said cache (DANE).

In addition, said first request may comprise an indication of the mode of operation.

The present invention further concerns a client terminal configured for receiving a multimedia content divided into segments and provided by at least one remote server, each segment being available in one or more representations. Said client terminal comprises a communication module configured for sending a request for a representation indicating a selected mode of operation to be applied by a cache arranged along a transmission path between said client terminal and one server.

In addition, said client may belong to a set comprising:
- a portable media device;
- a mobile phone;
- a game device;
- a set top box;
- a TV set;
- a tablet;
- a laptop; and
- an integrated circuit.

The present invention also concerns a method for sending, by a client terminal, a request for a representation of segment of a multimedia content divided into segments available in one or more representations, said multimedia content being provided by at least one remote server. Said request comprises an indication of a selected mode of operation to be applied by a cache arranged along a transmission path between said client terminal and one server.

The present invention further concerns a computer program product downloadable from a communication network and/or recorded on a medium readable by computer and/or executable by a processor, comprising program code instructions for implementing the steps of the above mentioned method.

In addition, the present invention also concerns a non-transitory computer readable medium comprising a computer program product recorded thereon and capable of being run by a processor, including program code instructions for implementing the steps of the method previously described.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1, 2A and 2B, the represented blocks are purely functional entities, which do not necessarily correspond to physically separate entities.

Figure 1:
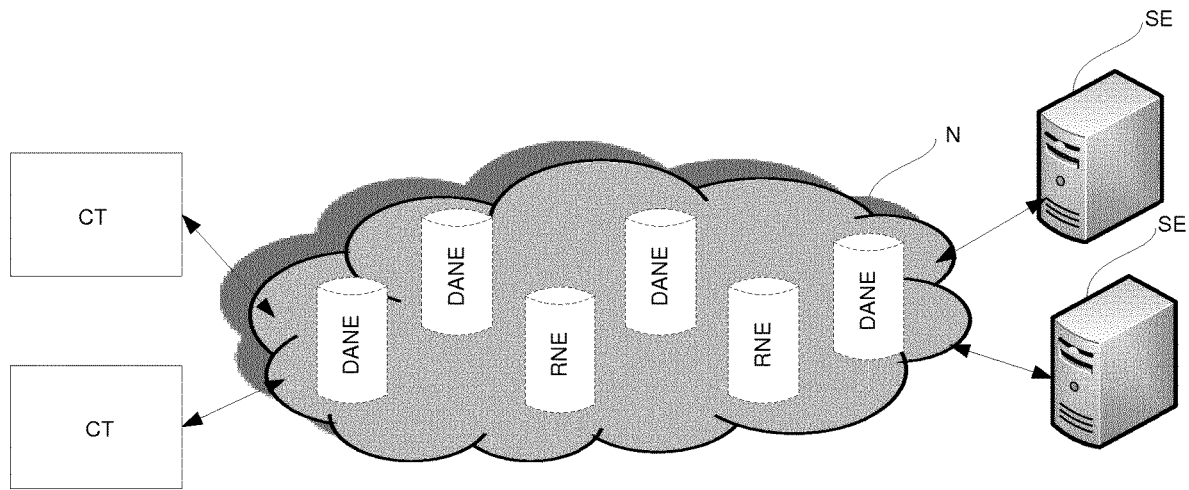
FIG. 1 is a schematic diagram of a Client-Server network architecture wherein the present invention might be implemented.

Namely, they could be developed in the form of software, hardware, or be implemented in one or several integrated circuits, comprising one or more processors.

Wherever possible, the same reference numerals will be used throughout the figures to refer to the same or like parts.

DESCRIPTION OF EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

According to a preferred embodiment, the present invention is depicted with regard to the HTTP adaptive streaming protocol (or HAS). Naturally, the invention is not restricted to such a particular environment and other adaptive streaming protocol could of course be considered and implemented.

As depicted in FIG. 1, the Client-Server network architecture, supported by one or several networks N (only one is represented in the Figures), wherein the present invention might be implemented, comprises one or several client terminals CT, one or more HTTP servers SE, plurality of smart caches DANE and one or more legacy caches RNE. According to DASH, such servers SE are also named Media Origin. They generate for instance the media presentation description (or MPD), so called manifest. This is the source of content distribution: the multimedia content may come from some external entity and be converted to HAS format at the Media Origin.

A smart cache DANE is a caching element in the network N that is configured to understand that HAS content is delivered. Using MPEG-DASH terminology, a smart cache is considered as DASH Aware Network Element (DANE).

A legacy cache RNE is a caching element in the network N which has no knowledge of the type of data that transits through it, or at least it does not understand the HAS aspects.

In MPEG-DASH terminology, a legacy cache is considered as Regular Network Element (RNE).

The client terminal CT wishes to obtain a multimedia content from one of the HTTP servers SE. Said multimedia content is divided into a plurality of segments. It is assumed that the multimedia content is available at different representations at a server SE. The HTTP server SE is able to stream segments to the client terminal CT, upon the client request, using HTTP adaptive streaming protocol over one or more TCP/IP connections.

In the preferred embodiment, the client terminal CT is a portable media device, a mobile phone, a tablet or a laptop, a TV set, a Set Top Box, a game device or an integrated circuit. Naturally, the client terminal CT might not comprise a complete video player, but only some sub-elements such as the ones for demultiplexing and decoding the media content and might rely upon an external means to display the decoded content to the end user. In this case, the client terminal CT is a HTTP Adaptive Streaming (HAS) capable video decoder, such as a set-top box.

Figure 2A:
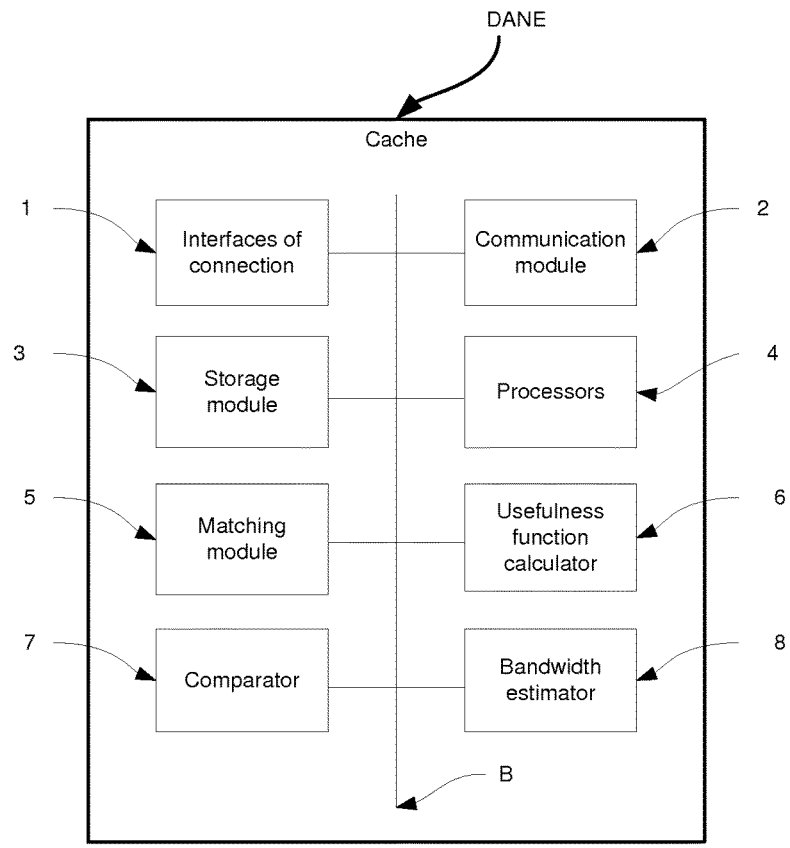
FIG. 2A is a block diagram of an example of a smart cache client according to a preferred embodiment of the present invention.

As shown in FIG. 2A, a smart cache DANE comprises:
- one or more interfaces of connection 1 (wired and/or wireless);
- a communication module 2 comprising the protocol stacks to communicate through the interfaces of connection 1. In particular, the communicating module can comprise an Internet Protocol stack, noted IP stack;
- a storage module 3, such as a volatile memory and/or a permanent memory, for storing segments of multimedia contents received from one or more servers SE in order to transmit them to client terminals CT, requesting such multimedia contents;
- one or more processors 4 for executing the applications and programs stored in the storage module 3;
- an internal bus B to connect the various modules, processing means and all means well known to the skilled in the art for performing the generic residential gateway functionalities.

Figure 2B:
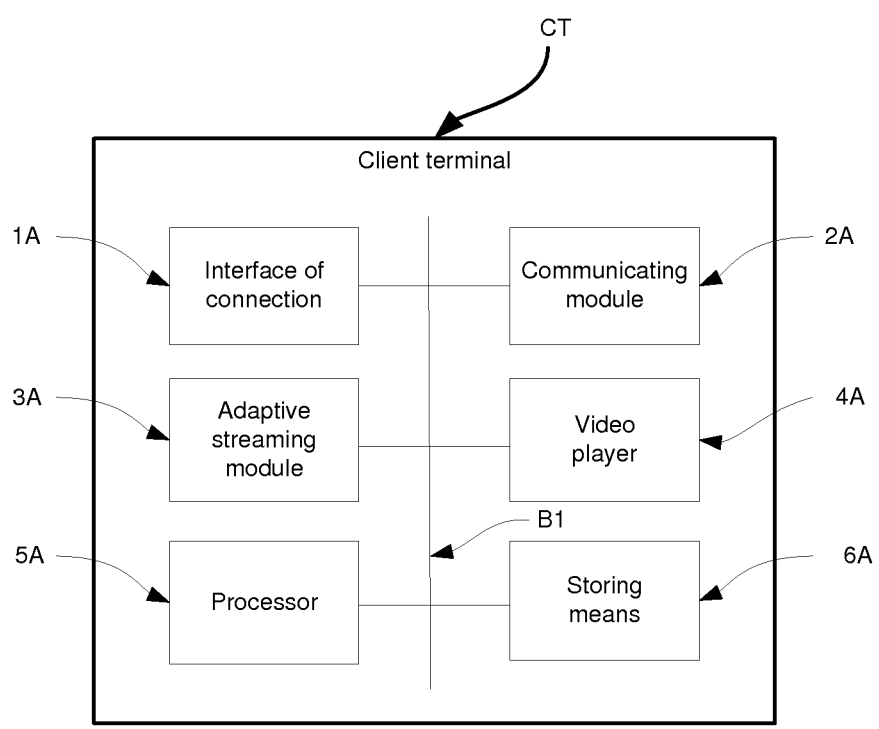
FIG. 2B is a block diagram of an example of a client terminal according to a preferred embodiment of the present invention.

As shown in FIG. 2B, the client terminal CT comprises at least:
- an interface of connection 1A (wired and/or wireless, as for example Wi-Fi, Ethernet, ADSL, Cable, Mobile and/or Broadcast (e.g. DVB, ATSC) interface);
- a communication module 2A containing the protocol stacks to communicate to the HTTP server SE. In particular the communication module 2A comprises the TCP/IP stack well known in the art. Of course, it could be any other type of network and/or communicating means enabling the client terminal CT to communicate to the HTTP server SE;
- an adaptive streaming module 3A which receives the HTTP streaming multimedia content from the HTTP server SE. It continually selects the segment at the bit rate that better matches the network constraints and its own constraints;
- a video player 4A adapted to decode and render the multimedia content;
- one or more processors 5A for executing the applications and programs stored in a non-volatile memory of the client terminal CT;
- storing means 6A, such as a volatile memory, for buffering the segments received from the HTTP server SE before their transmission to the video player 4A;
- an internal bus B1 to connect the various modules and all means well known to the skilled in the art for performing the generic client terminal functionalities.

In the following, it is assumed that a given client terminal CT sends a first request on the network N to obtain a given segment of a multimedia content. Said first request comprises a preferred requested representation and one or more alternative requested representations. Such a type of request is, for instance, described in the European patent application EP13305909.7 filed by the Applicant and incorporated herein by reference, and wherein said request may use one "altlist" additional directive to list alternative representations.

According to the preferred embodiment, the smart cache DANE also comprises:
- a matching module 5 which is configured to determine if at least one ongoing representation of the given segment—which has already been requested at a server SE by the smart cache DANE for a further client terminal CT—matches the preferred or an alternative representation of the first request (sent by the given client terminal CT). Said matched ongoing representation can already be stored in the smart cache DANE or can be currently downloading. To this end, the matching module 5 may use the URLs (Uniform Resource Locator) associated with the representations requested in the first request (request URL, altlist extension header);
- a calculator 6 adapted to determine the value of a usefulness function U of a matched ongoing representation of the given segment identified by the matching module 5. As described hereinafter, the usefulness function U may depend on a mode of operation associated with the smart cache DANE or the client terminal CT;
- a comparator 7 which is adapted to determine the matched ongoing representation already requested by said smart cache having the highest value of the usefulness function U, in case several ongoing representations matched the representation of the first request. In addition, said comparator 7 is further configured to check whether the determined value of the usefulness function U of an ongoing representation meets a performance criterion or not. In an illustrative, but non limitative example, the performance criterion is met when the value of the usefulness function exceeds zero (i.e. U>0).

In addition, the smart cache DANE may also comprise a bandwidth estimator 8 configured to determine the bandwidth along the transmission path between a smart cache DANE and a server SE. To this end, the bandwidth estimator 8 may, for instance, count the number of received bytes on the path. The bandwidth is then estimated by dividing the number of received bytes over a period of time. Naturally, any other mechanisms may be used to estimate such a bandwidth. The bandwidth estimator 8 might be integrated within the calculator 6.

According to the preferred embodiment, the usefulness function U depends on a mode of operation which is associated with the smart cache DANE or the client terminal CT. The mode may be determined by the owner of the smart cache DANE or, in a variant, in function of one or several network parameters (such as, the bandwidth along the path between the smart cache and a given server). In a further variant, the client terminal may indicate the desired mode of operation in its request for a segment (e.g. by providing additional information to the altlist header of the request); according to end user personal preferences or after the payment of subscription fees allowing improved services.

The mode of operation of the smart cache DANE may be stored in the storage module 3 (e.g. a random access memory (RAM), a local memory (e.g. a Hard Disk or Flash memory)).

In particular, the mode of operation is chosen amongst an aggressive mode, a fast mode or a quality mode. Obviously the number of modes is not limitative and may be different from three without departing from the present invention.

In the aggressive mode, the value of usefulness function U is equal to a constant. In this mode of operation, the desired effect from the smart cache DANE is to maximize the cache hit rate and to reduce the server to cache traffic to its bare minimum, by matching the preferred and alternative representations of the first request with the ongoing representations. When any of these representations is currently being downloaded, then the first request will be scheduled to be served upon reception of the matched ongoing representation. Thus, whenever possible, only one representation may advantageously be downloaded from the server SE.

In the fast mode, the usefulness function U depends on the delivery time from the server SE of the preferred representation of said first request and the delivery time of a matched ongoing representation already requested by the smart cache DANE. The delivery time may be easily computed by dividing the number of bytes of a request by the estimated bandwidth between the smart cache DANE and the server SE. For requests associated with matched ongoing representations, the delivery time may be computed by dividing the number of remaining bytes to be transferred by the bandwidth between the smart cache DANE and the server SE. In particular, the usefulness function U is defined by the difference between the delivery time from the server SE of the preferred representation of the first request and the delivery time of a matched ongoing representation already requested by the smart cache DANE. When the fast mode is selected, the calculator 6 is able to compute projected arrival times of representations of the given segment. The fast mode prevents the downloading of a matched ongoing representation from lasting longer than the requesting and downloading of the preferred representation of the first request. Thus long processing requests will be backed by an additional, shorter request. Nevertheless, when a large request associated with a matched ongoing representation is almost finished, the smart cache DANE will wait for its completion instead of triggering another fast request for retrieving, for instance, the preferred representation of the first request.

In the quality mode, the usefulness function U depends on the quality of the preferred representation and the quality of a matched ongoing representation already requested by said cache. More particularly, the usefulness function U of the quality mode is defined by the difference between the quality (e.g. the bitrate) of the preferred representation of the first request and the quality of a considered ongoing representation already requested by the smart cache DANE. The quality mode relies on quality, meaning that an ongoing representation matching with a representation of the first request of the client terminal CT is served only when quality of this ongoing representation is higher than or equal to the quality of the preferred representation of the first request.

For the quality mode, the smart cache DANE needs to know the relative quality of the representations. For DASH content, usually the higher bit rates correspond to a higher quality, but obviously a separate signaling means could also be used (e.g. metadata added to the representations). It is then assumed the use of a quality metric for comparing representations.

Figure 3:
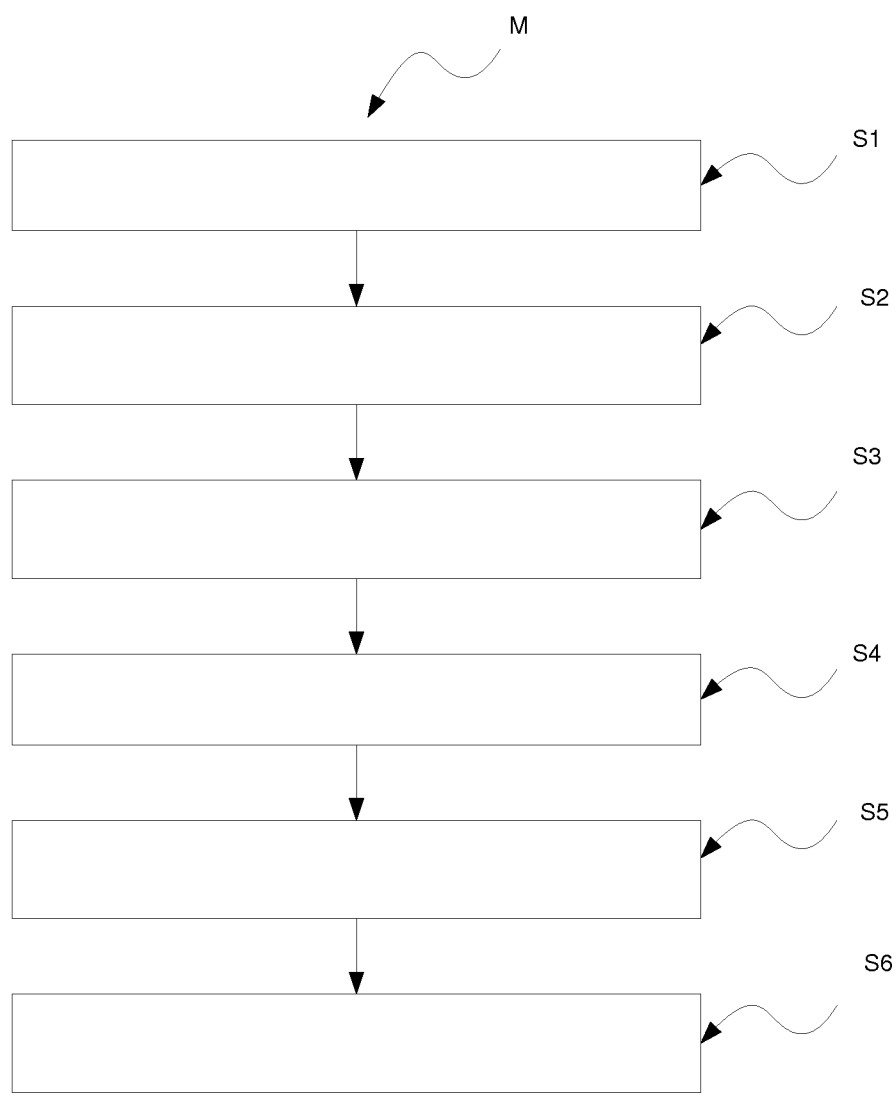
FIG. 3 is a flow chart illustrating the method for operating the smart cache of the FIG. 2A, according to the preferred embodiment.

As shown in the FIG. 3, the smart cache DANE is configured to select a representation of a given segment of a multimedia content to deliver to a client terminal CT according to its request and a determined mode of operation. To this end, the smart cache DANE can implement the following mechanism M comprising: receiving (step S1) from a first client terminal, a first request for a preferred and alternative representations of the given segment of the multimedia content;
determining (step S2) if at least one ongoing representation of the given segment—which has already been requested at a server SE by the smart cache DANE for a further client terminal CT—matches the preferred or an alternative representations of the first request;
determining (step S3) the value of a usefulness function for each matched ongoing representation of the given segment (said ongoing representation having already been requested by said cache). In particular:
when the aggressive mode of operation has been chosen, the value of the usefulness function is constant (e.g. U=1);
when the fast mode of operation has been chosen, the usefulness function is defined by:

$$U=\text{deliverytime}(\text{preferred\_rep})-\text{deliverytime}(\text{matched\_ongoing\_rep})$$

when the quality mode of operation has been chosen, the usefulness function is defined by:

$$U=\text{quality}(\text{matched\_ongoing\_rep})+\varepsilon-\text{quality}(\text{preferred\_rep})$$

wherein ε is a constant used to discriminate between sufficiently different qualities. When comparing representation qualities, if the difference of the qualities (the absolute value) is lower than ε, then the representations are considered of equivalent quality. ε might be chosen equal to zero.
selecting (step S4) the matched ongoing representation with the highest value of the usefulness function, which meets the performance criterion. In particular, for the aggressive mode, when it exists several matched ongoing representations and since the value of the utility function is constant, the selected matched ongoing representation corresponds to one of the representations of the first requested by preference order (preferred representation, first alternative, second alternative, etc.). In a further variant of the aggressive mode, the selected matched ongoing representation corresponds to the representation with the shortest delivery time;
transmitting (step S5), by said cache to the first client terminal CT, the selected ongoing representation, already requested by the cache (and possibly currently downloading from the sever SE). When none of the matched ongoing representations has a usefulness value meeting the performance criterion (i.e. no matched ongoing representation has been selected), the preferred representation of the first request is thus requested (step S6) by the smart cache DANE to the server SE.

It should be understood that the order of the steps S0 to S6 may be changed, without departing from the present invention.

Figure 4:
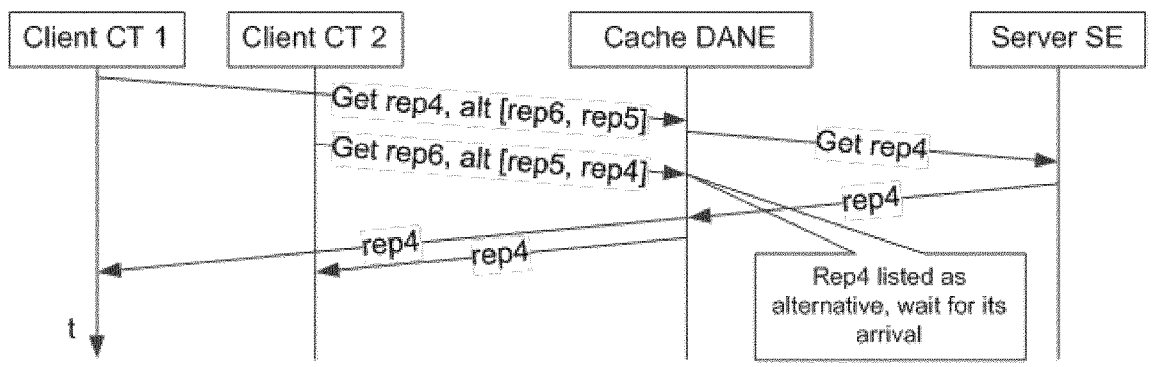
FIGS. 4 to 6 depict three illustrative examples of the implementation of the method of FIG. 3, respectively for an aggressive mode, a fast mode and a quality mode.

In a first illustrative but non limitative example of the aggressive mode compliant with the preferred embodiment, the time diagram shown in FIG. 4 represents the requests sent by client terminals CT1, CT2 for a segment (Get rep4, alt [rep6, rep5], Get rep6, alt [rep5, rep4]), a request sent by the smart cache DANE (Get rep4) for an ongoing representation, the response sent by the server SE (rep4) and the responses sent by the cache DANE to the client terminals CT1, CT2 (rep4).

It might be noted that, in the aggressive mode, the usefulness and the performance parameter may be ignored and not computed or checked, without departing from the present invention.

In particular, the client terminal CT 2—assumed to correspond to the first terminal as previously mentioned—sends a request for a preferred representation (rep6) and alternative representations (rep5, rep4). Representation 6 (rep6) is also assumed to be of a better quality than representation 4 (rep4).

According to the aggressive mode, in response to its first request, the client terminal CT2 receives the alternative representation "rep4", since said alternative representation was in the process of downloading or downloaded (in response to a previous request of a further client terminal CT1) when its request reached the smart cache DANE.

Figure 5:
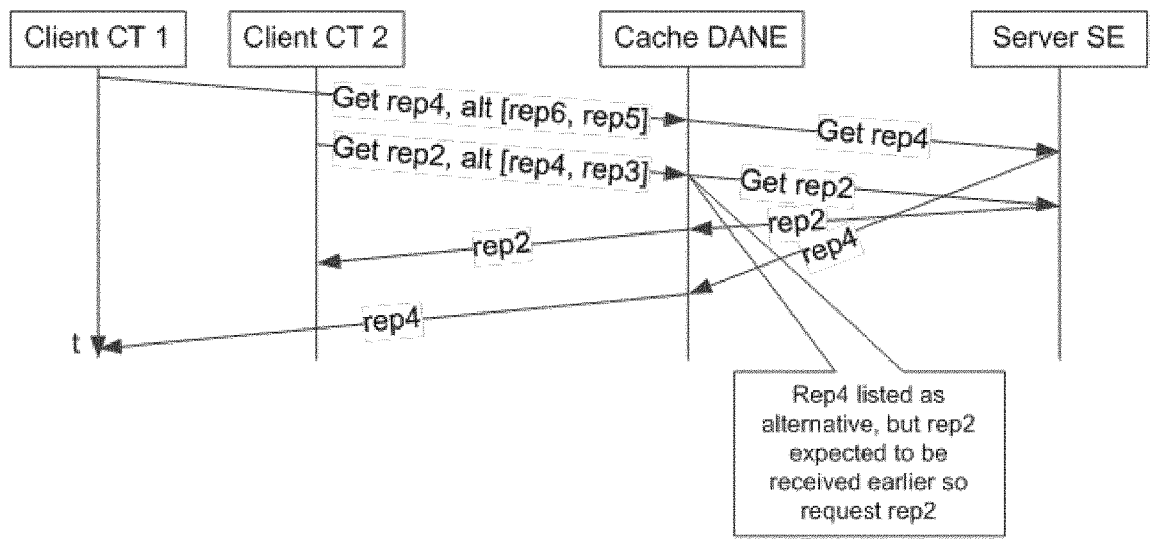

In a second illustrative but non limitative example of the fast mode compliant with the preferred embodiment, the time diagram shown in FIG. 5 depicts the requests and responses exchanged between client terminals CT1, CT2, a smart cache DANE and a server SE.

Particularly, the client terminal CT2 sends a request for a preferred representation (rep2) and alternative representations (rep4, rep3). There is one ongoing representation (rep 4)—already requested by the smart cache DANE—matching an alternative representation of the request of the client terminal CT2.

Nevertheless, the expected delivery time of the preferred representation (rep 2) requested by the client terminal CT2 is earlier than the delivery time of the matched ongoing representation (rep 4) already requested, so that the smart cache DANE will request said preferred representation (rep2) for the client terminal CT2.

Figure 6:
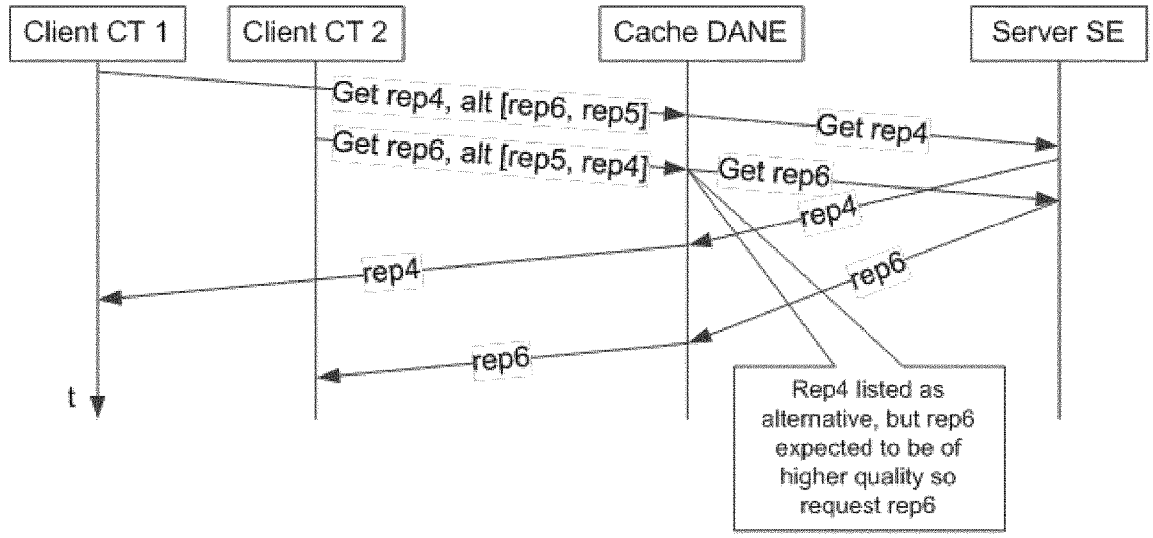

In a third illustrative but non limitative example of the quality mode compliant with the preferred embodiment, the time diagram of FIG. 6 also shows the requests and responses exchanged between client terminals CT1, CT2, a smart cache DANE and a server SE.

In this example, the client terminal CT2 sends a request for a preferred representation (rep6) and alternative representations (rep5, rep4). As for first example, representation 6 (rep6) is assumed to be of a better quality than representation 4 (rep4). There is one ongoing representation (rep4)—already requested by the smart cache DANE—matching an alternative representation of the request of the client terminal CT2.

Assuming that the quality of the matched ongoing representation rep4 (already requested by the smart cache DANE for the client terminal CT1) is determined to be lower than the one of preferred representation 6, the smart cache DANE will request said preferred representation (rep6) for the client terminal CT2.

Thus, the preferred embodiment consists in considering a request from a client terminal CT, comprising a preferred representation and its alternatives as a whole, to be matched against the operations already in progress in order to determine the usefulness of issuing another request towards a server SE. When a match is found, the smart cache DANE performs a computation to determine whether the request will be handled by issuing a new request towards the server SE or serialized after an ongoing request (e.g. served with the result of the ongoing request) to reduce the amount of traffic with the servers.

It should be noted that the smart cache DANE may be integrated in a proxy, in a gateway or in any other suitable network equipment.

The flowchart and/or block diagrams in the Figures illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a random access memory (RAM); a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for operating a cache configured to be arranged along a transmission path between a plurality of client terminals and at least one server, comprising:
   requesting a first ongoing representation of a segment of a multimedia content from the at least one server, based on a first request from a first client terminal of the plurality of client terminals;

receiving, from a second client terminal of the plurality of client terminals, a second request comprising a preferred representation and at least one alternative representation of the segment of the multimedia content, while receipt of the first ongoing representation at the cache, from the at least one server, is pending download completion; and determining that the first ongoing representation matches at least one of the preferred representation or the alternative representation of the second request.

2. The method according to claim 1, further comprising:
determining a first value of a usefulness function associated with the first ongoing representation; and
transmitting, to the second client terminal, the first ongoing representation, when the first value of the usefulness function meets a performance criterion.

3. The method according to claim 2, further comprising:
receiving a second ongoing representation of the segment of a multimedia content from the at least one server prior to receiving the second request;
determining that the second ongoing representation matches at least one of the preferred representations or an alternative representation of the second request;
determining a second value of the usefulness function associated with the second ongoing representation.

4. The method according to claim 3, further comprising requesting the preferred representation of the second request from the server when neither the first value of the usefulness function nor the second value of the usefulness function meets the performance criterion.

5. The method according to claim 3, further comprising transmitting the second ongoing representation when the second value of usefulness function is greater than the first value of usefulness function.

6. The method according to claim 2, wherein the performance criterion is met when the value of the usefulness function exceeds zero.

7. The method according to claim 2, wherein the usefulness function depends on a mode of operation is selected from one of:
an aggressive mode wherein the value of usefulness function is equal to a constant,
a fast mode wherein the usefulness function is based on the delivery time from the server of the preferred representation of the second request and the delivery time of the first ongoing representation, and
a quality mode wherein the usefulness function is based on the quality of the preferred representation of the second request and the quality of one of a plurality of matched ongoing representation already requested, the plurality of matched ongoing representations comprising the first ongoing representation.

8. The method according to claim 7, wherein the mode of operation is determined based on at least one network parameter.

9. The method according to claim 7, wherein the mode of operation is determined by the second client terminal and is indicated within the second request.

10. A network equipment comprising a cache adapted to be located along a transmission path between a plurality of client terminals and at least one server, comprising:
a receiver configured to receive a first ongoing representation of a segment of a multimedia content from the at least one server, based on a first request from a first client terminal of the plurality of client terminals;

an interface of connection for receiving, from a second client terminal of the plurality of client terminals, a second request for a preferred representation and at least one alternative representation of the segment of said multimedia content while receipt of the first ongoing representation at the cache, from the at least one server, is pending download completion; and a matching module configured to determine that the first ongoing representation matches at least one of the preferred representation or an alternative representation of the second request.

11. The network equipment according to claim 10, wherein the cache further comprises a calculator adapted to determine a first value of a usefulness function associated with the first ongoing representation.

12. The network equipment according to claim 11, wherein the receiver is further configured to receive a second ongoing representation of the segment of a multimedia content from the at least one server prior to receiving the second request;
wherein the matching module is further configured to determine that the second ongoing representation matches at least one of the preferred representations or an alternative representation of the second request; and
wherein the calculator is further adapted to determine a second value of the usefulness function associated with the second ongoing representation.

13. The network equipment according to claim 11, wherein the cache further comprises a comparator configured to select one of the first ongoing representation or the second ongoing representation based on determining whether the second value of the usefulness function is higher than the first value of the usefulness function.

14. The network equipment according to claim 12, wherein the cache further comprises a comparator configured to select one of the first ongoing representation or the second ongoing representation and the to determine that the selected first or second value of the usefulness function meets a performance criterion.

15. A client terminal configured to receive a multimedia content divided into segments and provided by at least one remote server, each segment being available in one or more representations, the client terminal comprising:
a communication module configured to send a request for a representation, the request comprising a selected mode of operation to be applied by a cache arranged along a transmission path between said client terminal and at least one remote server, and
wherein the cache is configured to receive and concurrently processing concurrent requests for one or more particular segments of the segments of multimedia content available in one or more representations from the client terminal while receipt of the one or more particular segments, as requested by a second client terminal, is pending download completion.

* * * * *